United States Patent
Khatri (10) Patent No.: US 9,619,289 B2
(45) Date of Patent: Apr. 11, 2017

(54) WORKLOAD OPTIMIZED SERVER FOR INTELLIGENT ALGORITHM TRADING PLATFORMS

(71) Applicant: Dell Products, L.P., Round Rock, TX (US)

(72) Inventor: Mukund P. Khatri, Cedar Park, TX (US)

(73) Assignee: Dell Products, L.P., Round Rock, TX (US)

(*) Notice: Subject to any disclaimer, the term of this patent is extended or adjusted under 35 U.S.C. 154(b) by 415 days.

(21) Appl. No.: 14/483,597

(22) Filed: Sep. 11, 2014

(65) Prior Publication Data

US 2016/0077840 A1  Mar. 17, 2016

(51) Int. Cl.
*G06F 9/30* (2006.01)
*G06F 9/50* (2006.01)

(52) U.S. Cl.
CPC ............ *G06F 9/505* (2013.01); *G06F 9/5094* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 4,746,920 A | 5/1988 | Nellen | |
| 7,239,581 B2 | 7/2007 | Delgado et al. | |
| 7,340,629 B2 | 3/2008 | Kates et al. | |
| 7,340,630 B2 | 3/2008 | Morris et al. | |
| 7,412,353 B2 | 8/2008 | Borkar et al. | |
| 7,814,252 B2 | 10/2010 | Hoshaku | |
| 8,615,763 B2 | 12/2013 | Raghu | |
| 8,689,037 B2 | 4/2014 | Rychilik | |
| 2006/0036878 A1 | 2/2006 | Rothman et al. | |
| 2006/0149975 A1 | 7/2006 | Rotem et al. | |
| 2007/0156370 A1 | 7/2007 | White et al. | |
| 2009/0106576 A1 | 4/2009 | Jacobowitz et al. | |
| 2009/0296359 A1 | 12/2009 | Farkas et al. | |
| 2014/0068290 A1* | 3/2014 | Bhandaru | G06F 1/26 713/320 |
| 2014/0108778 A1* | 4/2014 | Molloy | G06F 9/223 713/100 |
| 2014/0157284 A1* | 6/2014 | Sambasivan | G06F 9/4893 718/105 |

* cited by examiner

*Primary Examiner* — William B Partridge
(74) *Attorney, Agent, or Firm* — Fogarty LLP (57) ABSTRACT

Systems and methods for a workload optimized server for intelligent algorithm trading platforms. In an illustrative, non-limiting embodiment, an Information Handling System (IHS) may include a plurality of Central Processing Units (CPUs) and a control circuit coupled to the plurality of CPUs, the control circuit having a memory configured to store program instructions that, upon execution by the control logic, cause the IHS to: set a first number of enabled cores in a first CPU to operate with a first all-core turbo frequency, and set a second number of enabled cores in a second CPU to operate with a second all-core turbo frequency, where the first number of enabled cores is different from the second number of enabled cores, and where at least one of the first or second all core turbo frequencies is selected to cause the IHS to operate with reduced execution jitter.

20 Claims, 6 Drawing Sheets

| NUMBER OF ENABLED CORES | ENABLED CORE(S) |
|---|---|
| 1 | 0 104 |
| 2 | 7 118 |
| 3 | 1 106 |
| 4 | 6 116 |
| 5 | 3 110 |
| 6 | 4 112 |
| 7 | 2 108 |
| 8 | 5 114 |

|  | 4 CORES | 8 CORES | 12 CORES | 16 CORES |
|---|---|---|---|---|
| NON-AVX ALL-CORE TURBO | 2.6 GHz | 2.4 GHz | 2.2 GHz | 2.0 GHz |
| AVX ALL-CORE TURBO | 2.3 GHz | 2.2 GHz | 2.1 GHz | 2.0 GHz |

WORKLOAD OPTIMIZED SERVER FOR INTELLIGENT ALGORITHM TRADING PLATFORMS

FIELD

This disclosure relates generally to computer systems, and more specifically, to systems and methods for a workload optimized server for intelligent algorithm trading platforms.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An IHS may be designed with a multi-core processor. A multi-core processor is a single computing component with two or more independent processor cores that are able to read and execute program instructions or software code. These multiple cores can run multiple instructions concurrently, thus increasing the overall processing speed for programs. Multiple cores typically are integrated onto a single integrated circuit die or integrated circuit or onto multiple dies in a single chip package, generally referred to as the IHS's Central Processing Unit (CPU). In some cases, a single IHS may include two or more multi-core processors. A multiprocessor IHS is a computing system fitted with two or more CPUs, where each CPU may include two or more processing cores.

SUMMARY

Embodiments of systems and methods for a workload optimized server for intelligent algorithm trading platforms are described herein. In an illustrative, non-limiting embodiment, an Information Handling System (IHS) may include a plurality of Central Processing Units (CPUs); and a control circuit coupled to the plurality of CPUs, the control circuit having a memory configured to store program instructions that, upon execution by the control logic, cause the IHS to: set a first number of enabled cores in a first CPU to operate with a first all-core turbo frequency and set a second number of enabled cores in a second CPU to operate with a second all-core turbo frequency, where the first number of enabled cores is different from the second number of enabled cores, and where at least one of the first or second all core turbo frequencies is selected to cause the IHS to operate with reduced execution jitter.

For example, the control circuit may include basic input output (BIOS) logic, a first portion of an application may be run by the first CPU, and a second portion of the application may be run by the second CPU. The first portion of the application may include frequency sensitive threads and the second portion of application may include parallel execution sensitive threads. In some cases, the application may include a high frequency trading application, the first portion may include a feed handling or trading platform, and the second portion may include an analytics platform.

The first number of enabled cores may be smaller than the second number of enabled cores, and the first all-core turbo frequency may be greater than the second all-core turbo frequency. The program instructions, upon execution by the control logic, may further cause the IHS to select the first and second all-core turbo frequencies using a turbo boost frequency table. The first all-core turbo frequency is a highest frequency available for the first number of enabled cores in the turbo boost frequency table.

In some implementations, the program instructions, upon execution by the control logic, further cause the IHS to change at least one of the first number of enabled cores or the second number of enabled cores, and change at least one of the first or second all-core turbo frequencies to reduce the execution jitter. Additionally or alternatively, the program instructions may further cause the IHS to schedule all Advanced Vector Extensions (AVX) threads on the second CPU instead of the first CPU.

In another illustrative, non-limiting embodiment, a computer-implemented method may include receiving an indication of: (a) a first number of enabled cores in a first processor of a multi-processor IHS chosen to execute a first part of an application; (b) a second number of enabled cores in a second processor of the multi-processor IHS chosen to execute a second part of the application; and (c) a type of instruction to be executed within the first or second parts of the application; and selecting a first all-core turbo frequency of the first processor and a second all-core turbo frequency of the second processor to reduce an execution jitter of the application during concurrent execution of the first and second portions, the selection based upon the first number of cores, the second number of cores, and the type of instruction.

For example, the first and second number of enabled cores may be selected by a human user. The application may include a high frequency trading application, the first portion may include a feed handling and/or trading platform, and the second portion may include an analytics platform. The first number of enabled cores may be smaller than the second number of enabled cores, and the first all-core turbo frequency may be greater than the second all-core turbo frequency.

In some implementations, selecting the first and second all-core turbo frequencies may include using a turbo boost frequency table. The first all-core turbo frequency may be a highest frequency available for the first number of enabled cores in the turbo boost frequency table. Also, the type of instructions may include an AVX instruction.

In yet another illustrative, non-limiting embodiment, a non-transitory computer-readable medium may have program instructions stored thereon that, upon execution by an IHS, cause the IHS to receive an indication of a type of instruction to be executed by a first CPU; and select a first all-core turbo frequency of the first CPU and a second all-core turbo frequency of a second CPU to reduce an execution jitter of an application including one or more instructions of the indicated type, where the first all-core turbo frequency is different from the second all-core turbo frequency, and where at least one of the first or second CPUs has at least one of its cores disabled. The program instructions may further cause the IHS to receive an indication of a first number of cores in the first CPU chosen to execute a first part of an application and of a second number of cores in the second CPU to execute a second part of the application; and select the first and second all-core turbo frequencies based, at least in part, upon the first and second number of cores.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Systems and methods for reducing execution jitter of parallel threads in multiprocessor applications are described. Some software applications require very specific, precise, and/or deterministic code execution timing. Examples of such applications include, but are not limited to, real time applications, financial trading applications (e.g., high volume securities trading, automated securities trading, etc.), and control applications. Generally speaking, it is desirable that these applications have predictable execution times. When such an application is executed by an IHS having two or more multicore CPUs, however, certain non-deterministic code execution timing problems often arise.

As used herein, the term "execution jitter" refers to a difference in execution time for a given program or thread between the predicted execution time and the actual execution time at a given clock frequency. For example, if a given thread is predicted to execute in 10 milliseconds and some measured execution times are 8, 9, 11 and 13 milliseconds, the execution jitter is the difference between the measured times and 10 milliseconds. Execution jitter can occur for threads that execute in either longer or shorter times than the predicted or desired execution times. To address these, and other concerns, systems and methods described herein are provided that reduce execution jitter in software programs running on two or more multicore processors or CPUs. In various applications, these systems and methods may be used to provide a workload optimized server for intelligent algorithm trading platforms or the like.

Illustrative embodiments provide an IHS, a multi-core processor, and methods performed within the IHS that are suitable for: (1) reducing execution jitter in multi-core processors; (2) enabling one or more processor cores within a multi-core processor to operate at a pre-determined maximum or turbo frequency; (3) enable two or more multi-core processors to operate at distinct, pre-determined maximum turbo frequencies; and (4) provide consistent execution times for threads running on multiple cores of multiple processors, for example, when one or more cores are disabled, that is, when one or more cores are powered down or powered off, as opposed to simply non-active or unused.

In the following detailed description of exemplary embodiments of the disclosure, specific exemplary embodiments in which the disclosure may be practiced are described in sufficient detail a person of ordinary skill in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
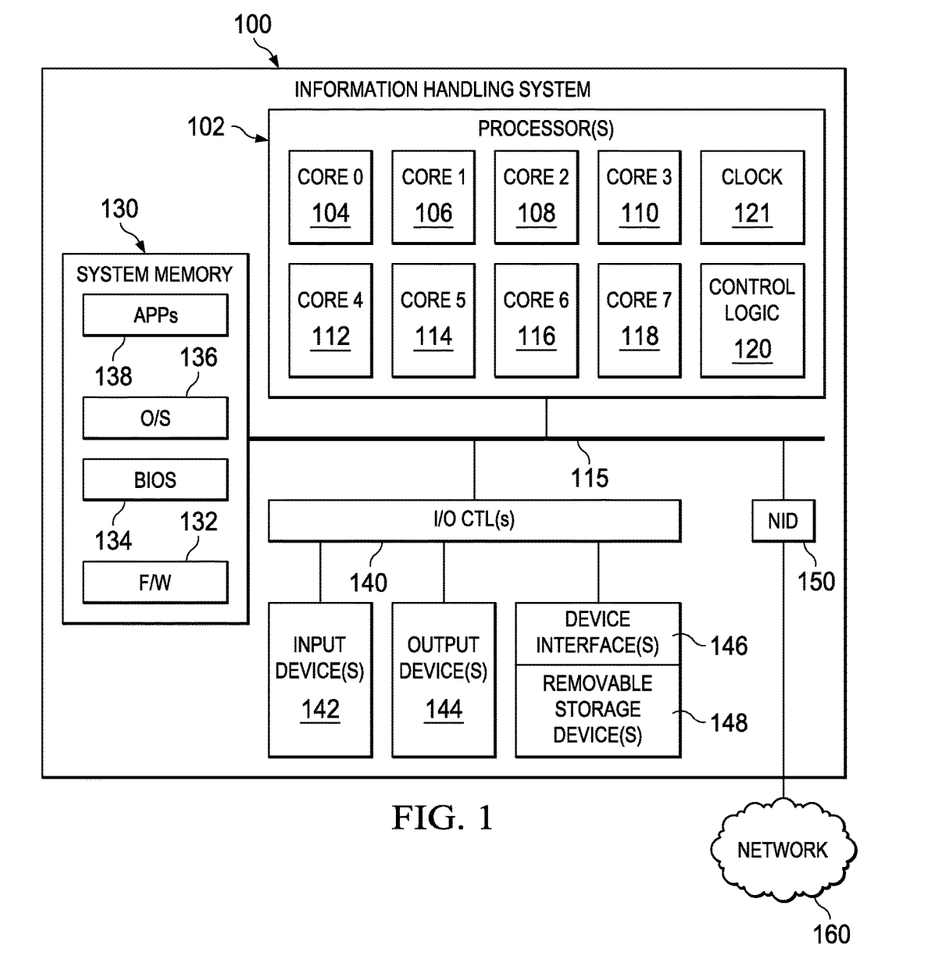
FIG. 1 illustrates an example IHS configured to implement various systems and methods described herein according to some embodiments.

FIG. 1 illustrates a block diagram representation of an example IHS 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 102 coupled to system memory 130 via system interconnect 115. System interconnect 115 can be interchangeably referred to as a system bus, in one or more embodiments. System memory 130 can include therein a plurality of software and/or firmware modules including firmware (F/W) 132, basic input/output system (BIOS) 134, operating system (O/S) 136, and application(s) 138. The one or more software and/or firmware modules within system memory 130 can be loaded into processor(s) 102 during operation of IHS 100.

Processor(s) 102 include several processor cores, including core 0 104, core 1 106, core 2 108, core 3 110, core 4 112, core 5 114, core 6 116 and core 7 118. Cores 104-118 can communicate with each other and with control logic 120. Control logic 120 can control the operation of cores 104-118. According to an aspect of the described embodiments, control logic 120 may be configured to control the operating frequency and voltage or operating state of cores 104-118. Control logic 120 can also receive software and/or firmware modules from system memory 130 during the operation of processor(s) 102. In an embodiment, clock 121 is provided on processor(s) 102 and enables the generation of several different periodic frequency signals that can be applied to one or more of the cores 104-118 within one or more processor(s) 102.

IHS 100 further includes one or more input/output (I/O) controllers 140 which support connection by, and processing of signals from, one or more connected input device(s) 142, such as a keyboard, mouse, touch screen, or microphone. I/O controllers 140 also support connection to and forwarding of output signals to one or more connected output devices 144, such as a monitor or display device or audio speaker(s). Additionally, in one or more embodiments, one or more device interfaces 146, such as an optical reader, a universal serial bus (USB), a card reader, Personal Computer Memory Card International Association (PCMCIA) slot, and/or a high-definition multimedia interface (HDMI), can be associated with IHS 100. Device interface(s) 146 can be utilized to enable data to be read from or stored to corresponding removable storage device(s) 148, such as a compact disk (CD), digital video disk (DVD), flash drive, or flash memory card. Device interfaces 146 can further include General Purpose I/O interfaces such as I.sup.2C, SMBus, and peripheral component interconnect (PCI) buses.

IHS 100 comprises a network interface device (NID) 150. NID 150 enables IHS 100 to communicate and/or interface with other devices, services, and components that are located external to IHS 100. These devices, services, and components can interface with IHS 100 via an external network, such as example network 160, using one or more communication protocols. Network 160 can be a local area network, wide area network, personal area network, and the like, and the connection to and/or between network and IHS 100 can be wired or wireless or a combination thereof. For purposes of discussion, network 160 is indicated as a single collective component for simplicity. However, it is appreciated that network 160 can comprise one or more direct connections to other devices as well as a more complex set of interconnections as can exist within a wide area network, such as the Internet.

A person of ordinary skill in the art will appreciate that the hardware components and basic configuration depicted in FIG. 1 and described herein may vary. For example, the illustrative components within IHS 100 are not intended to be exhaustive, but rather are representative to highlight components that can be utilized to implement systems and methods described herein. For example, other devices/components may be used in addition to or in place of the hardware depicted. The depicted example does not convey or imply any architectural or other limitations with respect to the presently described embodiments and/or the general disclosure.

Figure 2:
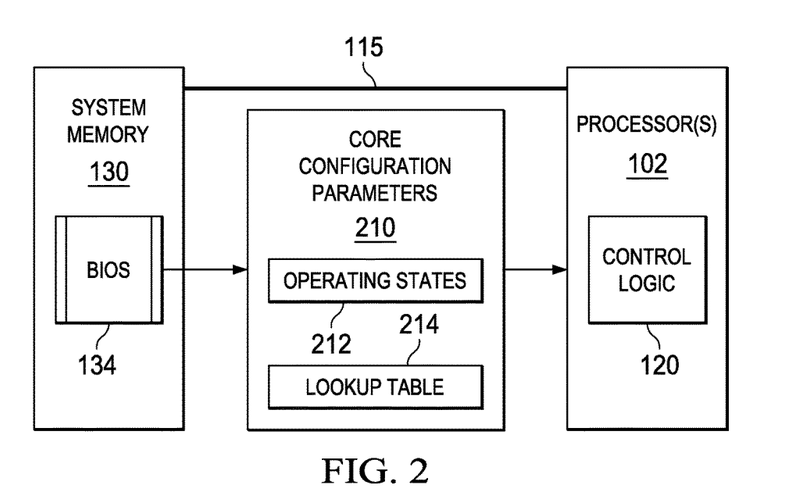
FIG. 2 illustrates an example of core configuration parameters being transmitted from a basic input output system (BIOS) to a processor control logic according to some embodiments.

With reference now to FIG. 2, there is illustrated an embodiment of core configuration parameters 210 being transmitted from the basic input output system (BIOS) 134 to processor control logic 120. In the discussion of FIG. 2, reference is also made to components illustrated in FIG. 1. During the initial startup of IHS 100 and processor(s) 102, core configuration parameters 210 are transmitted from the BIOS 134 to processor control logic 120. Core configuration parameters 210 include operating states 212 for cores 104-118 for each of processor(s) 102.

According to one aspect of the disclosure, examples of operating states 212 may include, for each distinct one of processor(s) 102: (a) identification of one or more cores selected to be enabled for operation at frequencies equal to or higher than the minimum clock frequency or core operating frequency; and (b) an identification of specific cores selected to be disabled, such that the disabled cores are not operational. Operating states 212 identify which of the one or more of cores 104-118 are to be selected to be disabled and/or enabled and identifies which of the one or more cores 104-118 are to be controlled for execution jitter.

Operating frequencies that are higher than the "rated" core operating frequency are referred to as turbo states or frequencies. For example, if the rated core operating frequency is 2.0 GHz, operating states 212 can be set or pre-determined such that one or more cores 104-118 operate at higher core frequencies such as 2.5 GHz, 3.0 GHz, 3.5 GHz, 4.0 GHz or other frequencies. That is, the rated frequency is the frequency the CPU stock keeping unit (SKU) is actually rated for; whereas turbo states are states that can be reached in an opportunistic manner to provide an operating frequency that is higher than the rated frequency depending upon operating conditions, which may vary over time.

Accordingly, as used herein, the "reference," "base," or "rated" operating frequency is, as its name suggest, the base CPU frequency. In some situations, a CPU may run at lower frequency that its rated frequency, for example, for power management reasons. In order for the CPU to run at a higher frequency than its rated frequency, turbo states may be used. Moreover, it should be noted that turbo frequencies may change as a function of the number of CPU cores that are enabled in a given configuration. For sake of illustration only, assume that for a given 12-core CPU, for example, the rated frequency is 2.7 GHz and the all-core turbo frequency when all 12 cores are enabled is 3.0 GHz. In this example, when 4 cores are disabled and the CPU operates with 8 enabled cores (in a particular configuration), the rated frequency is still 2.7 GHz; but the all-core enabled turbo frequency for the 8 enabled cores may be 3.2 GHz.

The maximum actual core frequency for each core is subject to on-chip limits in temperature, current, and power consumption. In one or more embodiments, core configuration parameters 210 also include an ordered lookup table 214 of the cores, in which the cores are ordered by the maximum physical distance separating each core on the chip or die. For example, as shown in FIG. 1, core 0 104 is physically located further away from core 7 118 than from core 4 112. Ordered lookup table 214 may be used to select one or more cores 104-118 for operation.

Core configuration parameters 210 may be pre-determined by a user and stored in (BIOS) 134. For example, operating states 212 can direct four of the cores 104-118 (e.g., core 0-core 3) to be disabled from operating and another (i.e., different) four of the cores 104-118 (e.g., core 4-core 7) to be enabled for operation and thus operate at a higher core operating frequency.

Figure 3:
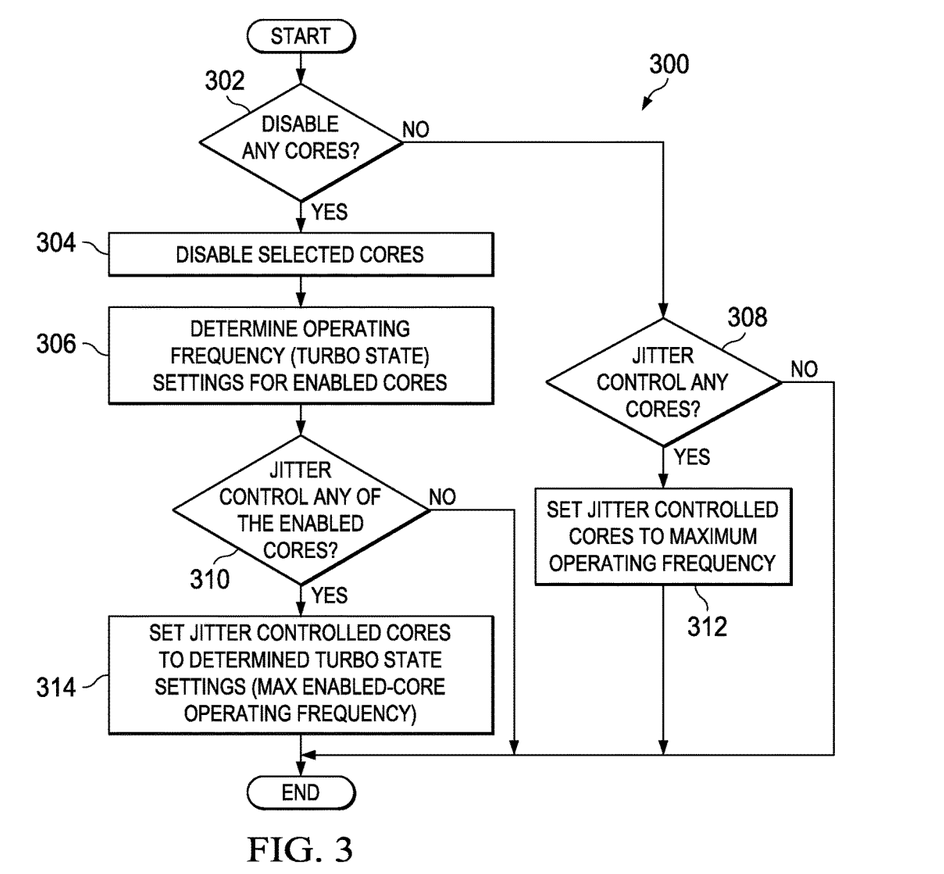
FIG. 3 is a flowchart illustrating an example of a method by which cores are disabled and/or enabled for operation and jitter control in a single multicore processor according to some embodiments.

FIG. 3 illustrates a flowchart of exemplary methods by which cores are (a) disabled and enabled for operation and by which (b) cores are controlled for reducing execution jitter. Generally, method 300 represents a computer-implemented method to reduce execution jitter in a single multicore processor, and to enable the processor's cores to be operated at higher operating frequencies. In the discussion of FIG. 3, reference is also made to components illustrated in FIGS. 1 and 2.

According to some embodiments, disabled cores do not perform execution of instructions and do not generate heat, while enabled cores operate at a higher frequency that is variable depending upon processor workloads and other factors that are internal to and based on the design of the processors. The foregoing distinction between enabled and disabled cores is presented in contrast with active versus non-active (or idle) cores. When a core is merely idle but is nonetheless enabled, it may not be used to execute threads but it still generates heat. Among enabled cores, jitter controlled cores are set to a pre-determined clock frequency as can be specified by a user. And, different jitter controlled cores can have different clock frequencies.

In some embodiments, when some of the cores in a given CPU package are disabled, the CPU's architecture may allow the remaining ones of the enabled cores to run at "Max-All-Core-Turbo-Frequency." This frequency is typically higher when less-than-max number of cores are enabled. That is, the lesser the number of enabled cores, the higher the all-core-max-turbo frequency in such CPU architectures.

Method 300 begins at the start block and proceeds to block 302 at which control logic 120 determines if any of the cores 104-118 are to be disabled from operation. Disabled cores are identified through the use of core configuration parameters 210 received from BIOS 134. Disabled cores do not operate and thus do not execute any instructions or generate heat. According to an embodiment, the rated or base operating frequency is the default or reference operating frequency for the cores. In response to none of the cores 104-118 being selected to be disabled, control logic 120 determines if any of cores 104-118 are to be jitter controlled (block 308). In response to none of cores 104-118 being selected to be jitter controlled, method 300 ends.

In response to one or more of cores 104-118 being selected to be jitter controlled, however, the one or more cores selected for jitter control are set by control logic 120 to operate at a maximum operating or turbo frequency that is dependent on the number of cores in operation (312). In some embodiments, control logic 120 sets the maximum operating frequency based upon pre-determined operating states 212. In other embodiments, control logic 120 sets the maximum operating frequency of the jitter controlled cores to the reference frequency or minimum core operating frequency. Moreover, in various embodiments, the maximum operating or turbo frequencies of each enabled core within a given processor may be set to a same value, herein referred to as an "all-core turbo frequency" for that processor. Method 300 then terminates at the end block.

In response to one or more of cores 104-118 being requested or selected to be disabled in block 302, control logic 120 disables the selected cores from operating at block 304 and determines the core operating frequency or turbo states for the enabled cores (306). Control logic 120 determines if any of the enabled cores are to be jitter controlled (310). In response to none of the enabled cores being selected to be jitter controlled, method 300 ends. At block 314, in response to one or more of the enabled cores being selected to be jitter controlled, control logic 120 sets or locks the cores selected for jitter control to operate at a maximum operating frequency or turbo state previously determined at block 306. Method 300 then terminates at the end block.

Method 300 allows a set of instructions or threads to execute across multiple cores that provide both fast execution times and consistent execution times (i.e., no jitter) within as single processor. With a set of one or more cores 104-118 (e.g., core 4-core 7) fixed to operate at a pre-determined operating frequency, the predicted execution time and the actual execution time will be the same, resulting in no execution jitter. For example, if the highest clock frequency that a set of instructions or threads executing with consistent execution times (no jitter) on multiple cores is 3.5 GHz, method 300 can set or restrict two or more of the cores 104-118 to operate at 3.5 GHz.

Figure 4:
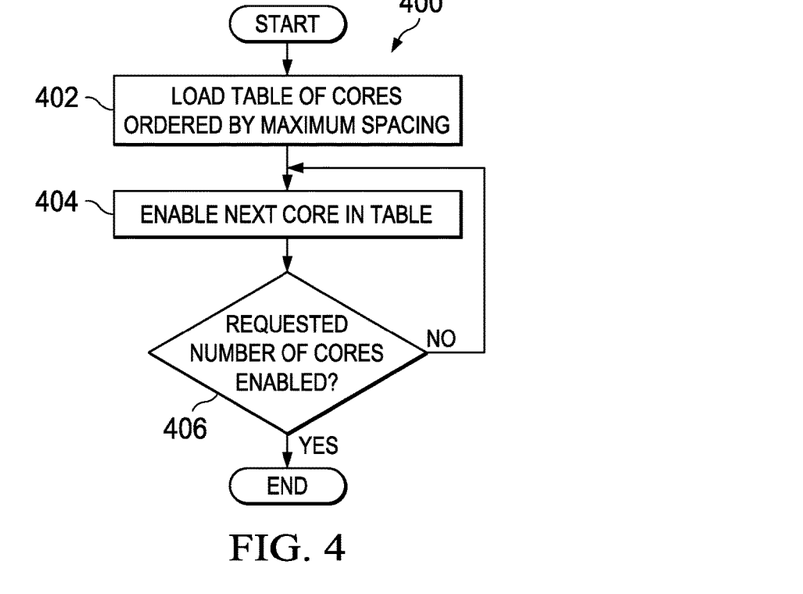
FIG. 4 is a flowchart illustrating an example of a method by which cores are disabled in a single multicore processor according to some embodiments.

Turning now to FIG. 4, a flowchart of a method 400 by which cores are enabled in a single multicore processor is shown. In the discussion of FIG. 4, reference is also made to components illustrated in FIGS. 1 and 2. Method 400 begins at the start block and proceeds to block 402 where lookup table 214 is loaded into control logic 120. Lookup table 214 contains an ordered table of the cores 104-118 ordered by the maximum physical distance or spacing on the chip or die (see, for example, maximum separation distance between core 0 104 and core 7 118 within processor(s) 102 of FIG. 1). Control logic 120 enables a first one of cores 104-118 (e.g., core 0 104) for operation in the order defined by lookup table 214 (block 404).

At block 406, control logic 120 determines if the requested or selected number of cores have been enabled for operation. In some implementations, the number of cores selected to be enabled for operation are determined by core configuration parameters 210 received from BIOS 134. In response to the selected number of cores being enabled, method 400 ends. In response to the selected number of cores not being enabled, method 400 returns to block 404 where control logic 120 enables the next core for turbo state operation in the order defined by lookup table 214.

Figure 5:
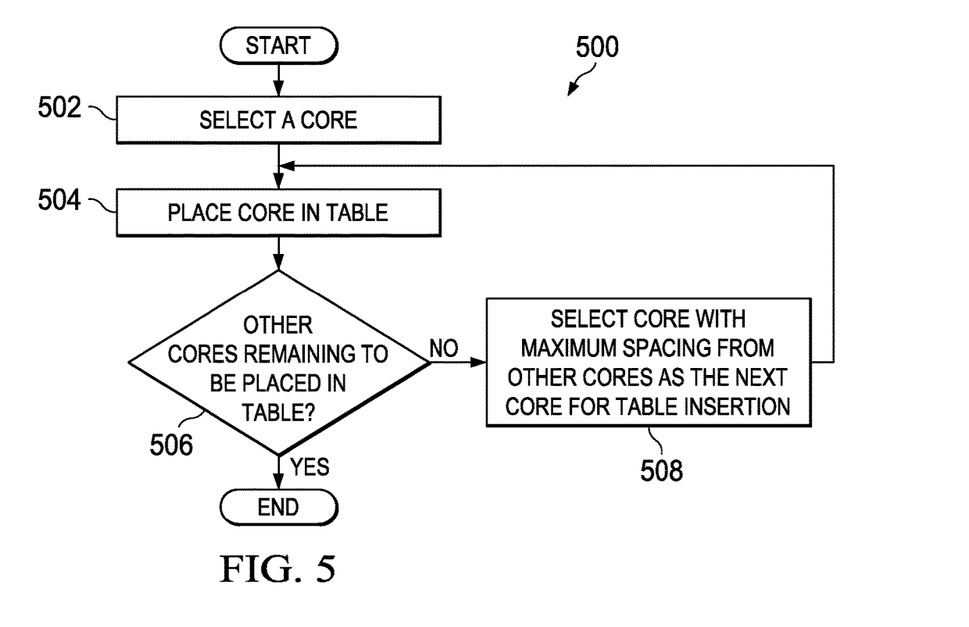
FIG. 5 is a flowchart illustrating an example of a method by which an ordered lookup table is generated according to some embodiments.

FIG. 5 illustrates a flowchart of a method 500 for generating an ordered lookup table 214. In the discussion of FIG. 5, reference is also made to components illustrated in FIGS. 1 and 2. Method 500 begins at the start block and proceeds to block 502 where one of cores 104-118 is selected by control logic 120. The selected core is placed into the lookup table 214 (block 504). At decision block 506, control logic 120 determines if all of the required cores 104-118 have been placed into the lookup table 214. In response to all of the cores being placed into the lookup table 214, method 500 terminates. In response to there being other cores remaining to be placed into the lookup table 214, control logic 120 selects (at block 508) the next core with maximum physical spacing distance from the previously selected core(s) in the processor (e.g., processor(s) 102, FIG. 1), and control logic 120 places the selected next core into the lookup table 214 (block 504). In some cases, the next core with maximum physical spacing distance is selected from among the other non-selected cores (i.e., cores that are not yet placed in the lookup table).

Figure 6:
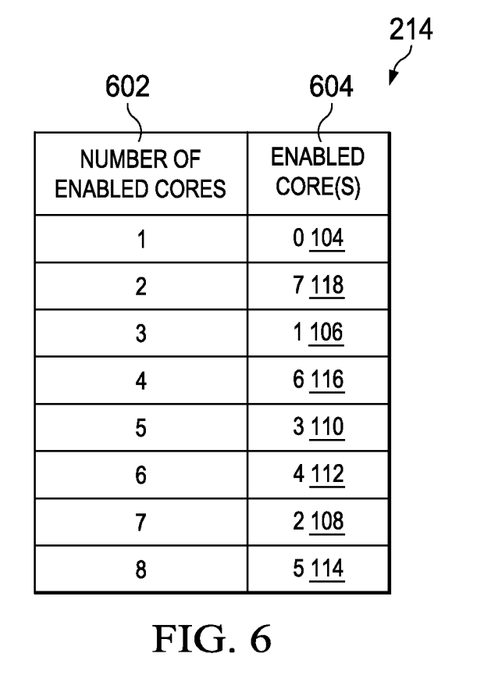
FIG. 6 is an example ordered lookup table identifying the sequence of enabling the cores based on the total number of enabled cores in a single multicore processor according to some embodiments.

Referring to FIG. 6, an embodiment of an ordered lookup table 214 presenting an increasing number of enabled cores and the corresponding enabled cores (at maximum physical spacing distance) generated by method 500 of FIG. 5 is shown. Ordered lookup table 214 is based on the cores with maximum physical spacing from each other. In the discussion of FIG. 6, reference is also made to components illustrated in FIG. 1 and FIG. 2. Lookup table 214 includes a first column, number of enabled cores 602, indicating the different number of cores than can be enabled, and a second column, enabled core(s) 604, identifying the specific core(s) that is enabled as the number of cores that are enabled increases.

Figure 7:
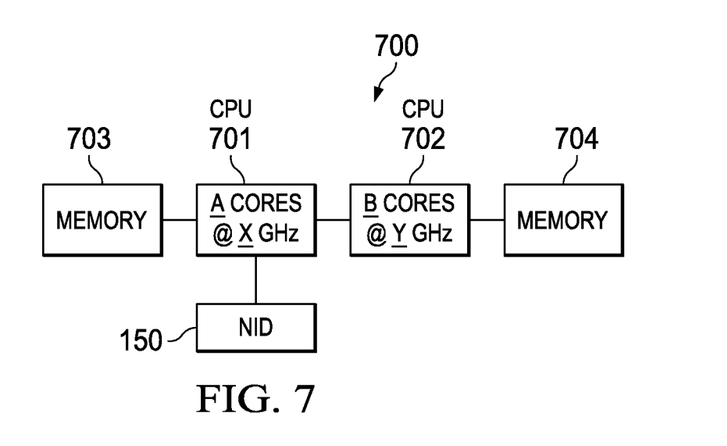
FIG. 7 is an example of a two-processor IHS configured to reduce execution jitter according to some embodiments.

FIG. 7 is an example of two-processor IHS 700 configured to reduce execution jitter. In the discussion of FIG. 5, reference is also made to components illustrated in FIGS. 1 and 2. Particularly, CPU 701 and CPU 702 may be part of processor(s) 102, memory 703 and memory 704 may be part of system memory 130 that are otherwise dedicated to CPUs 701 and 702, respectively, and NID 150 is also shown. In some cases, CPU 701 and CPU 702 may be the same part number, and therefore CPU 701 may have the same number of cores as CPU 702. In other cases, CPUs 701 and 702 may be different parts with different numbers of cores.

In some implementations, CPUs 701 and 702 may be configured to execute a high-frequency trading (HFT) application or the like. High-frequency trading (HFT) is the automated, rapid trading of securities. HFT uses specialized trading algorithms to move in and out of positions in seconds (or fractions of a second), moving in and out of short-term positions and aiming to capture small profits on every trade. IHSs designed for HFT can sometimes handle round-trip order execution speeds (from hitting "transmit order" to receiving an acknowledgment) in the order of low single digit to low double digit microseconds, therefore requiring very low latencies or high operating frequencies, with reduced execution jitter.

For example, a first portion of the application may include a feed handling, which receives data from a securities exchange. A second portion of the application may include an analytics platform configured to analyze the incoming data and make trading decisions. A third portion of the application may include a trading platform that sends trading orders (e.g., buy, sell, etc.) to the exchange.

In some cases, the feed handling and/or trading platform may be executed by CPU 701, and HFT data may be sent or received via NID 150. The analytics platform may in turn be executed by CPU 702. These various portions may be run concurrently, with parallel threads. Moreover, it may be desirable that CPU 702 use a higher number of cores than CPU 701 (A<B). For example, a given number of cores may be disabled in CPU 701 and a different number of cores may be disabled in CPU 702. Alternatively, all cores may be enabled in CPU 702.

Additionally or alternatively, it may be desirable that that CPU 701 have a higher all-core maximum or turbo frequency than CPU 702 (X>Y). By enabling (e.g., via the BIOS) a fewer number of cores in CPU 701, a higher turbo frequency may be reached for each enabled core in that CPU. Also, in some cases, the clock frequencies of CPUs 701 and 702 may be selected based upon a type of instruction expected to be executed by the CPU (e.g., Advanced Vector Extensions (AVX) instructions, or any other high power instructions now existing or yet to be developed, versus non-AVX or default instructions). These frequencies may be tuned using a turbo boost frequency table or the like and the reduced execution jitter methods described previously.

Figure 8:
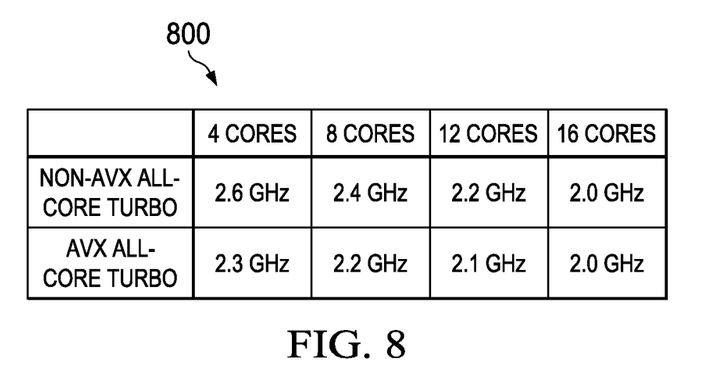
FIG. 8 is an example of a turbo boost frequency table used to reduce execution jitter of parallel threads in multiprocessor applications according to some embodiments.

FIG. 8 is an example of turbo boost frequency table 800 used to reduce execution jitter of parallel threads in multiprocessor applications according to some embodiments. In the discussion of FIG. 8, reference is also made to components illustrated in FIG. 7. As shown, the frequencies in table 800 account for a number of cores being used (e.g., 4, 8, 12, or 16) as well as the type of instruction executed by those cores (e.g., AVX or non-AVX). In some implementations, every enabled core in a given one of CPUs 701 or 702 operates at the same, execution jitter-free clock. Furthermore, one or more cores in a given one of CPUs 701 or 702 may be disabled.

For example, both CPUs 701 and 702 may have 16 available cores. If CPU 701 is selected to execute non-AVX code with 4 enabled cores (that is, 12 of the 16 cores are disabled or turned off), the all-core maximum turbo frequency for each of the 4 enabled cores may be set to 2.6 GHz. Conversely, if CPU 702 is selected to execute AVX code with 16 enabled cores (no cores are disabled), its all-core maximum turbo frequency may be set to 2 GHz. In combination with each other, the selected clock frequencies for CPUs 701 and 702 may provide a reduced or minimized execution jitter for high-end, low latency applications such as HFT platforms or the like.

Figure 9:
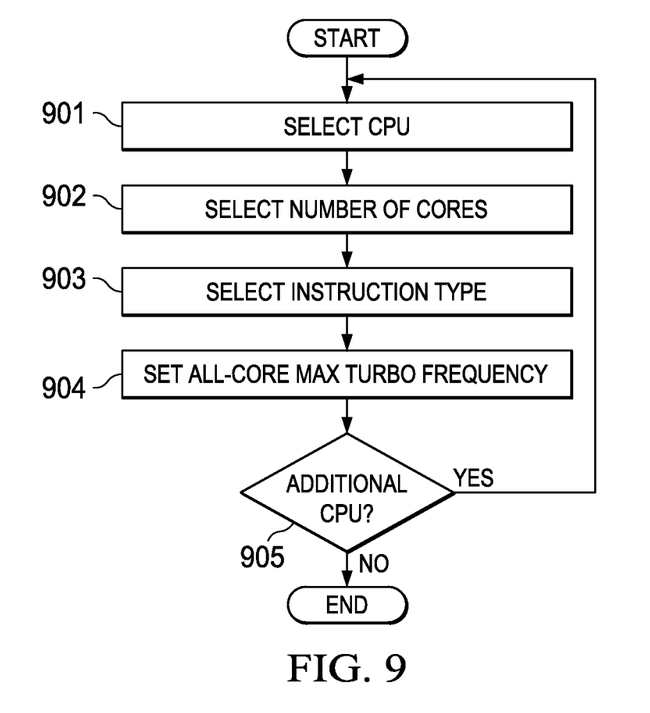
FIG. 9 is a flowchart illustrating an example of a method for reducing execution jitter of parallel threads in multiprocessor applications according to some embodiments.

FIG. 9 is a flowchart illustrating an example of method 900 for reducing execution jitter of parallel threads in multiprocessor applications. In some embodiments, method 900 may be performed, at least in part, by BIOS 134 of FIG. 1. Method 900 begins at the start block and proceeds to block 901, where a user may select one of a plurality of CPUs (e.g., CPU 701 of FIG. 7). At block 902, the user may select a number of cores to be used by the selected CPU. At block 903, the user may select the type of instruction to be executed by those cores. Additionally or alternatively, the type of instruction may be identified at runtime. Then, at block 904, method 900 includes setting an operating frequency of all cores in the selected CPU that provides jitter-free or reduced jitter operation, given the number of cores and/or instruction type, for example, using a turbo boost frequency table such as table 800 in FIG. 8. At block 905, if additional CPUs are being set up, control returns to block 901 where another CPU may be selected. Otherwise, method 900 ends.

Accordingly, in some embodiments, each CPU socket may be tuned to its specific workload threads, which enables tuning (optimized tradeoffs) for high single threaded performance for 1 socket while allowing tuning for highly parallel threads on a second socket. These systems and methods also provide the ability to customize a number of cores frequency per CPU in a jitter-free manner. As such, they enable a customer to optimize number of cores to get higher performance (higher speed of execution using higher all-core turbo frequencies) versus parallel performance (volume of instructions) for selected socket, and also enable the use of mixed CPUs in the IHS's configuration. Additionally or alternatively, these systems and methods may allow customers to optimize their total system performance by scheduling AVX-enabled threads on one socket while running non-AVX threads on another socket, thereby resulting in jitter free operation on ALL threads on both sockets without sacrificing performance for non-AVX threads.

Figure 10:
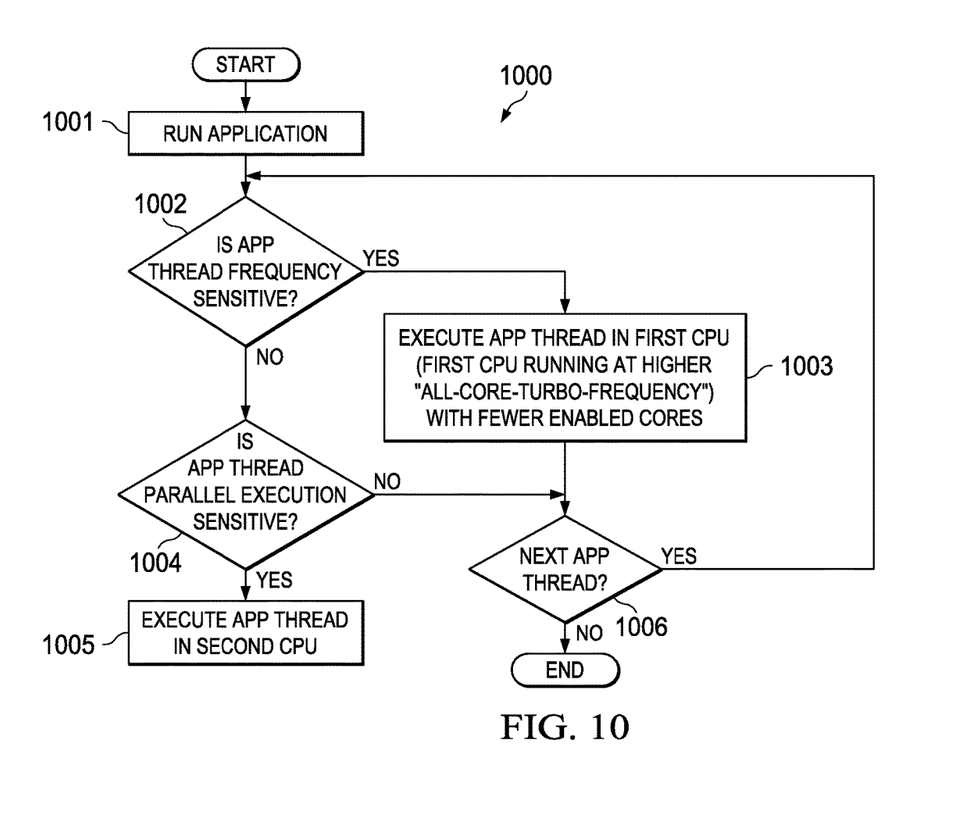
FIG. 10 is a flowchart illustrating an example of a method for executing workload optimized multiprocessor applications according to some embodiments.

FIG. 10 is a flowchart illustrating an example of a method for executing workload optimized multiprocessor applications according to some embodiments. In the discussion of FIG. 10, reference is also made to components illustrated in FIG. 7. Method 1000 begins at the start block and proceeds to block 1001, where a user may select an application to be run by processors or CPUs 701 and 702. As described in FIG. 7, such an application may have a number of portions, each portion having threads that are then scheduled to be executed by a given one of CPUs 701 or 702. In some cases, the first portion of the application may include frequency sensitive threads whereas the second portion of application may include parallel execution sensitive threads. For example, the application may include a high frequency trading application, a first portion of that application may include a feed handling or trading platform, and a second portion of that application may include an analytics platform.

At block 1002, method 1000 may determine whether a particular thread is classified as frequency sensitive (that is, a thread for which speed of execution is important or critical). If so, then the given thread is assigned to first CPU 701 at block 1003 (fewer enabled cores, higher all-core turbo frequency). Otherwise block 1004 determines whether the thread is classified as a parallel execution sensitive (that is, one for which a number of other threads need to be executed in parallel, concurrently, or simultaneously, for example, to collaborate or cooperate with each other). If so, then the given thread is assigned to second CPU 702 (more enabled cores; lower all-core turbo frequency). If not, then control passes to block 1006 where a second thread is selected, if it exists, and the process is repeated for each subsequent thread. Otherwise, method 1000 ends. In some cases, when a thread has not been classified as either frequency or parallel execution sensitive, conventional methods for assigning that thread to a given CPU (e.g., load balancing, etc.) may be used.

In the above described flowcharts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable a person of ordinary skill in the art to understand the disclosure for various embodiments with various modifications as are suited to the particular use contemplated.

The invention claimed is:

1. An Information Handling System (IHS), comprising:
a plurality of Central Processing Units (CPUs); and
a control circuit coupled to the plurality of CPUs, the control circuit having a memory configured to store program instructions that, upon execution by the control logic, cause the IHS to:
set a first number of enabled cores in a first CPU to operate with a first all-core turbo frequency and set a second number of enabled cores in a second CPU to operate with a second all-core turbo frequency, wherein the first number of enabled cores is different from the second number of enabled cores, and wherein at least one of the first or second all core turbo frequencies is selected to cause the IHS to operate with reduced execution jitter.

2. The IHS of claim 1, wherein the control circuit includes basic input output (BIOS) logic, wherein a first portion of an application is run by the first CPU, and wherein a second portion of the application is run by the second CPU.

3. The IHS of claim 2, wherein the first portion of the application includes frequency sensitive threads and wherein the second portion of application includes parallel execution sensitive threads.

4. The IHS of claim 3, wherein the application includes a high frequency trading application, wherein the first portion includes a feed handling and/or trading platform, and wherein the second portion includes an analytics platform.

5. The IHS of claim 1, wherein the first number of enabled cores is smaller than the second number of enabled cores, and wherein the first all-core turbo frequency is greater than the second all-core turbo frequency.

6. The IHS of claim 1, wherein the program instructions, upon execution by the control logic, further cause the IHS to select the first and second all-core turbo frequencies using a turbo boost frequency table.

7. The IHS of claim 5, wherein the first all-core turbo frequency is a highest frequency available for the first number of enabled cores in the turbo boost frequency table.

8. The IHS of claim 1, wherein the program instructions, upon execution by the control logic, further cause the IHS to:
change at least one of the first number of enabled cores or the second number of enabled cores, and change at least one of the first or second all-core turbo frequencies to reduce the execution jitter.

9. The IHS of claim 1, wherein the program instructions, upon execution by the control logic, further cause the IHS to schedule all Advanced Vector Extensions (AVX) threads on the second CPU instead of the first CPU.

10. A computer-implemented method, comprising:
receiving an indication of: (a) a first number of enabled cores in a first processor of a multi-processor Information Handling System (IHS) chosen to execute a first part of an application; (b) a second number of enabled cores in a second processor of the multi-processor IHS chosen to execute a second part of the application; and (c) a type of instruction to be executed within the first or second parts of the application; and
selecting a first all-core turbo frequency of the first processor and a second all-core turbo frequency of the second processor to reduce an execution jitter of the application during concurrent execution of the first and second portions, the selection based upon the first number of cores, the second number of cores, and the type of instruction.

11. The computer-implemented method of claim 10, wherein the first and second number of enabled cores are selected by a human user.

12. The computer-implemented method of claim 10, wherein the application includes a high frequency trading application, wherein the first portion includes a feed handling and/or trading platform, and wherein the second portion includes an analytics platform.

13. The computer-implemented method of claim 10, wherein the first number of enabled cores is smaller than the second number of enabled cores, and wherein the first all-core turbo frequency is greater than the second all-core turbo frequency.

14. The computer-implemented method of claim 10, wherein selecting the first and second all-core turbo frequencies includes using a turbo boost frequency table.

15. The computer-implemented method of claim 10, wherein the first all-core turbo frequency is a highest frequency available for the first number of enabled cores in the turbo boost frequency table.

16. The computer-implemented method of claim 10, wherein the type of instructions includes an Advanced Vector Extensions (AVX) instruction.

17. A non-transitory computer-readable medium having program instructions stored thereon that, upon execution by an Information Handling System (IHS), cause the IHS to:
receive an indication of a type of instruction to be executed by a first CPU; and
select a first all-core turbo frequency of the first CPU and a second all-core turbo frequency of a second CPU to reduce an execution jitter of an application including one or more instructions of the indicated type, wherein the first all-core turbo frequency is different from the second all-core turbo frequency, and wherein at least one of the first or second CPUs has at least one of its cores disabled.

18. The non-transitory computer-readable medium of claim 17, wherein the type of instructions includes an Advanced Vector Extensions (AVX) instruction.

19. The non-transitory computer-readable medium of claim 17, wherein the program instructions, upon execution by the IHS, further cause the IHS to:
 receive an indication of a first number of cores in the first CPU chosen to execute a first part of an application and of a second number of cores in the second CPU to execute a second part of the application; and
 select the first and second all-core turbo frequencies based, at least in part, upon the first and second number of cores.

20. The non-transitory computer-readable medium of claim 19, wherein the application includes a high frequency trading application, wherein the first portion includes a feed handling and/or trading platform, and wherein the second portion includes an analytics platform.

\* \* \* \* \*